United States Patent [19]
Folsom

[11] Patent Number: 4,934,804
[45] Date of Patent: Jun. 19, 1990

[54] FOCUSING OPTICAL EXPLOSIVE INITIATOR AND INITIATOR WINDOW

[75] Inventor: Mark Folsom, Hollister, Calif.

[73] Assignee: Whittaker Ordnance, Inc., Hollister, Calif.

[21] Appl. No.: 296,650

[22] Filed: Jan. 13, 1989

[51] Int. Cl.⁵ ............................................. G02B 26/02
[52] U.S. Cl. ..................................... 350/618; 350/321
[58] Field of Search ............... 350/618, 619, 625, 319, 350/443, 620, 287, 424, 96.10; 362/299, 300, 307, 308, 297; 102/201

[56] References Cited

U.S. PATENT DOCUMENTS

| | | | |
|---|---|---|---|
| 2,023,332 | 12/1935 | Malivert | 350/319 |
| 2,995,973 | 8/1961 | Barnes et al. | 350/620 |
| 3,893,754 | 7/1975 | McInally | 350/619 |

Primary Examiner—Eugene R. LaRoche
Assistant Examiner—T. V. Tran
Attorney, Agent, or Firm—Donald E. Nist

[57] ABSTRACT

The novel optical explosive initiator employs a window of a new type. The window hermetically seals the initiator explosive and is a transparent preferably monolithic block or cylinder of glass or the like solid material having a mirrored convex entrance end in the configuration of a segment of a spheroid, paraboloid, ellipsoid or hyperboloid and having an unmirrored opening therethrough along the longitudinal axis of the cylinder. The opposite exit end of the cylinder is mirrored and is perpendicular to the cylinder longitudinal axis and is at least nearly flat, preferably entirely flat. It includes an unmirrored opening along the longitudinal axis of the cylinder. An optical fiber transmitting light, such a laser light, can be positioned adjacent to the entrance opening. Light passing therethrough and into the cylinder is reflected from the flat mirrored end back to the mirrored convex end and is focused to a concentrated beam of high intensity which focused beam then passes out the exit opening to an explosive initiator. Therefore, much less power is needed to initiate the desired explosive reaction.

12 Claims, 3 Drawing Sheets

FOCUSING OPTICAL EXPLOSIVE INITIATOR AND INITIATOR WINDOW

PRIOR ART STATEMENT

No search of the prior art has been made. So far as is known to applicant, heretofore optical windows in optical explosive initiators have been flat and have not focused light beams passing therethrough. In contrast, the window utilized in the present optical explosive initiator focuses the light beam passing into it so as to increase its intensity of illumination by as much as four times, thereby reducing the power required to optically initiate an explosive reaction. Accordingly, the present claimed invention is believed to be patentable.

BACKGROUND OF THE INVENTION

1. Field of the Invention

The present invention generally relates to explosive devices and more particularly to an improved light-activated explosive initiator and an improved window for said initiator.

2. Prior Art

Explosive devices initiated by light transmitted through an optical fiber or the like customarily either use a sealed flat glass window or the like that does not focus the light and is disposed between the optical fiber and the explosive in the initiator or use no window at all, but, instead, place the optical fiber in direct contact with the explosive material to be initiated. Under most circumstances, it is desirable or necessary to seal off the explosive from direct contact with the optical fiber and from environmental degradation and thus the flat transparent window is used.

However, light passing from an optical fiber into and through a flat transparent window spreads out in a conical fashion so that the light beam diameter grows larger as the glass window thickness increases and thus the distance between the optical fiber and explosive increases. The intensity of illumination falls off correspondingly, adversely affecting the ability of the light to initiate the explosive reaction. Each explosive initiator design requiring a window is therefore a compromise between the need for the window in order to resist internal pressure and to effect an hermetic seal and the need to keep the intensity of illumination high enough to initiate the desired explosive chemical reaction, considering the limited light power available.

It would be desirable to be able to provide an improved light initiated optical explosive initiator which could provide the effective hermetic sealing and high burst pressure afforded by a thick window while reducing the light power requirement necessary to initiate an explosive reaction. Such device should also not be any more sensitive to stray light and undesired explosive initiation than conventional devices.

SUMMARY OF THE INVENTION

All the foregoing needs have been satisfied by the improved optical explosive initiator of the present invention employing the novel window of the present invention. The initiator and window are substantially as set forth in the Abstract of the Disclosure.

Thus, the initiator includes an initiator explosive hermetically sealed by the novel window. The window substitutes for a conventional flat window in the initiator and is a transparent preferably monolithic block or cylinder of glass or the like having a mirrored convex entrance end in the configuration of a segment of a spheroid, paraboloid, ellipsoid or hyperboloid and having an unmirrored entrance opening therein along the longitudinal axis of the cylinder.

The opposite exit end of the cylinder is also mirrored and is flat or nearly flat, being perpendicular to the longitudinal axis of the cylinder and having an unmirrored exit opening along that axis. Light passing, as from an optical fiber, into the window through the entrance opening, passes through the window and is reflected by the mirrored exit end back to the mirrored convex end where it is intensified by as much as four times before it passes out of the exit opening into the initiator explosive to ignite it. Accordingly, the window drastically reduces the light power requirement to initiate the explosive chemical reaction in the initiator, without sacrificing hermetic sealing, high burst strength and safety against initiation by random radiation.

Further features of the present invention are set forth in the following detailed description and accompanying drawings.

DRAWINGS

Figure 1:
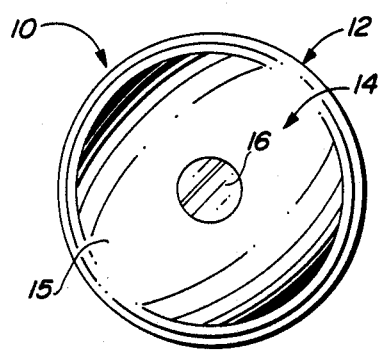
FIG. 1 is a schematic entrance end view of a first preferred embodiment of the improved optical initiator focusing window of the present invention.
Figure 7:
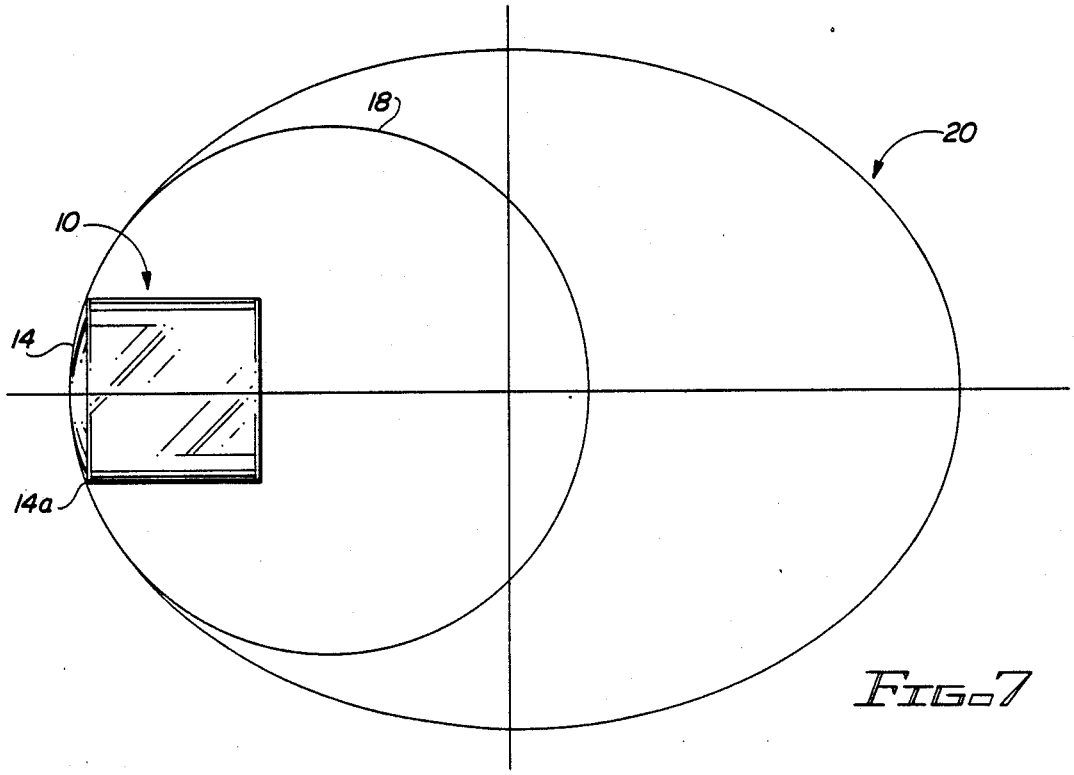
Figure 5:
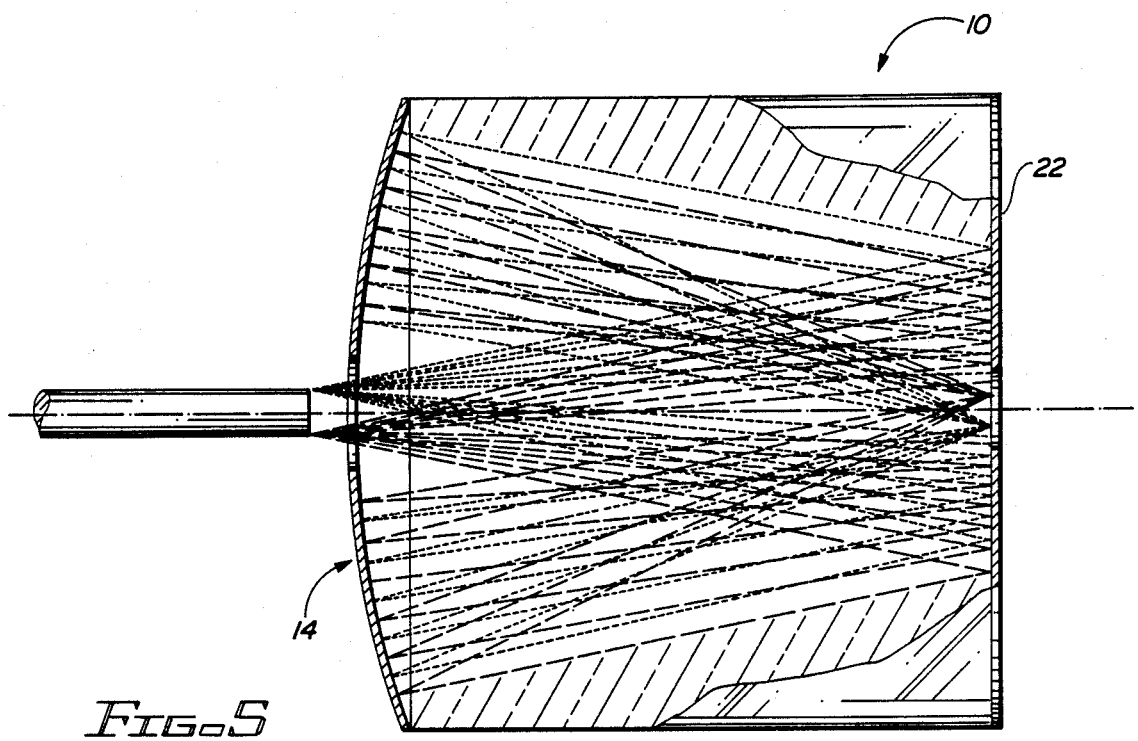
FIG. 5 is an enlarged schematic side elevation of the window of FIG. 1, showing the paths of various beams of light therethrough.
Figure 6:
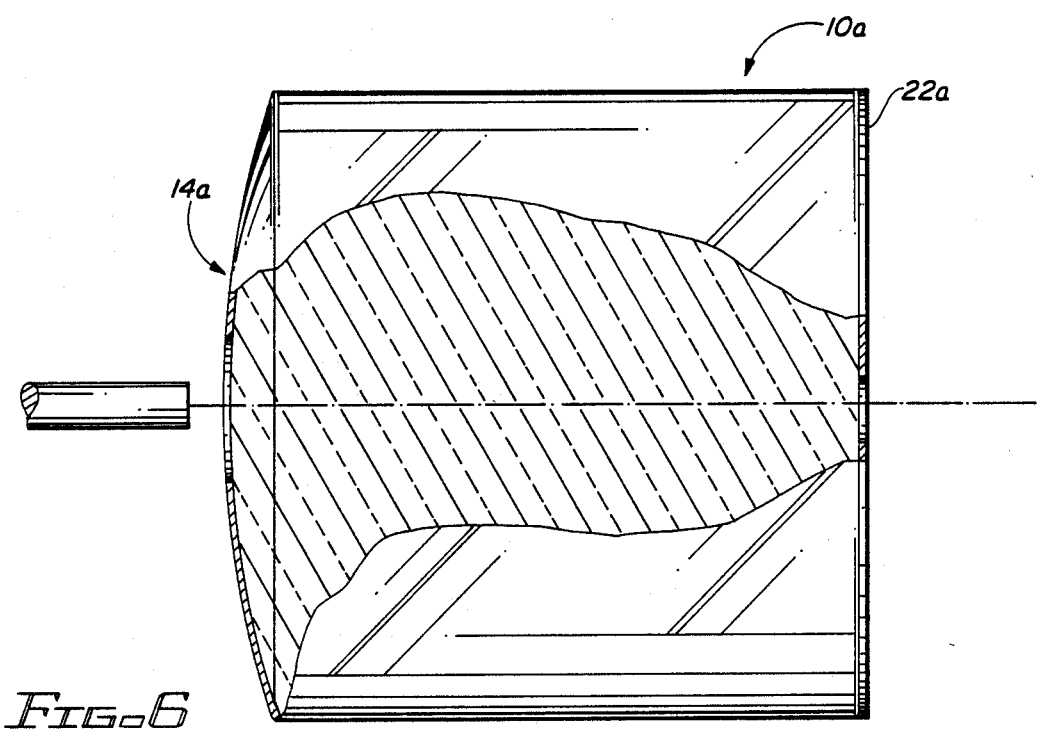

FIG. 6 is an enlarged schematic side elevation of a second preferred embodiment of the improved focusing window of the present invention, the convex mirrored end thereof being paraboloidal; and, FIG. 7 is a schematic diagram depicting the window of FIG. 1 with the mirrored convex end thereof being of the configuration of a segment of a sphere and substantially identical to a segment of an ellipsoid of greater main diameter than that of the sphere.

DETAILED DESCRIPTION

FIGS. 1–7

Figure 2:
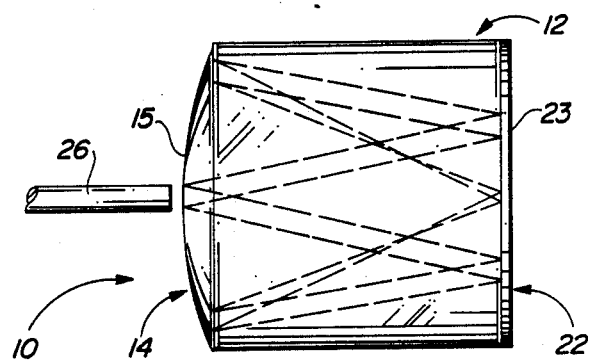
FIG. 2 is a schematic side elevation of the window of FIG. 1.
Figure 3:
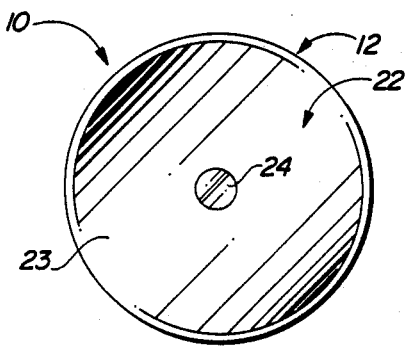
FIG. 3 is a schematic exit end view of the window of FIG. 1.

Now referring more particularly to the drawings, FIGS. 1, 2 & 3 schematically depict three views of a preferred embodiment of the improved optical explosive initiator window of the present invention. Thus, window 10 is shown which comprises a transparent preferably monolithic block, in this instance a cylinder 12 of glass, crystal, plastic, or the like, having appropriate optical properties and a convex entrance end 14 the entire surface 15 of which is mirrored, as by silver plating or the like, except for an unmirrored entrance opening 16 at the longitudinal axis of cylinder 12. Convex end 14 is essentially a segment of a sphere 18 (FIG. 7). Alternatively, it could be a segment of a paraboloid (FIG. 6), identified as 14a, or ellipsoidal (FIG. 7), providing the ellipsoid has a sufficiently large major diameter. As can be seen from FIG. 7, ends 14 and 14b are substantially identical, end 14 being a segment of sphere 18 and end 14b being a segment of an ellipse 20. Convex end 14 could also be a segment of an hyperboloid.

The opposite exit end 22 of cylinder 12 also has a surface 23 fully mirrored except for a central opining 24 at the longitudinal axis of cylinder 12. End 22 is essentially flat, being essentially perpendicular to the longitudinal axis of cylinder 12. Preferably, exit end 22 is fully flat and exactly perpendicular to the longitudinal axis of cylinder 12.

When a beam of light passes from a light source such as an optical fiber 26 (FIG. 2) aligned with opening 16, it passes into and through cylinder 12 and is, without focusing, reflected off the inside of the mirrored surface 23 at the exit end 22 of cylinder 12 back towards convex mirrored surface 15 the inside of which reflects it and focuses it to form a half-size image of the source beam at or near the plane of exit end 22. Such beam exits end 22 through opening 24 for effecting initiation of an explosive. The approximate one-half magnification is accompanied by an approximate doubling of the divergence angle of the beam. Inasmuch as the diameter of the focused beam is about half that of the beam emanating from the optical fiber, it can be as much as about four times stronger in intensity of illumination. The result is that much less power is needed for explosive initiation than is required by the prior art devices, even though window 10 is thicker and stronger than conventional windows in explosive initiator devices.

Using window 10, explosive initiators can be built having full hermetic seals, extremely high burst strengths and lower initiation power requirements. Moreover, window 10 is no more sensitive to stray radiation initiation than conventional windows.

Figure 4:
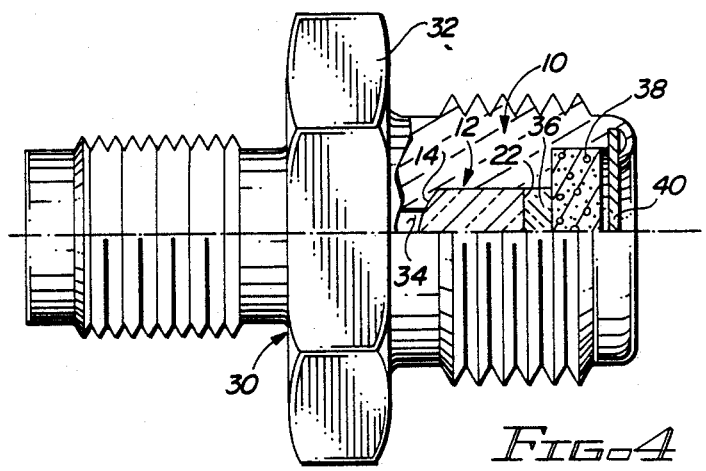
FIG. 4 is a schematic side elevation, partly broken away, of a preferred embodiment of an optical explosive initiator of the present invention, employing the window of FIG. 1.

Window 10 is shown (FIG. 4) installed in a preferred embodiment of the optical explosive initiator of the present invention. Thus, initiator 30 is shown in FIG. 4 and comprises a metal fitting body 32 having a central passageway 34 extending therethrough in which an optical fiber (not shown) can be installed adjacent to the entrance end 14 of window 10, as indicated in FIG. 2. Window 10 is hermetically sealed in passageway 34 to block it. Exit end 22 of cylinder 12 abuts a consolidated prime explosive or pyrotechnic material 36 in passageway 34 in turn abutting the main explosive load 38 of initiator 30 in passageway 34. Load 38 and passageway 34 are sealed off at the downstream end thereof by an output closure 40 welded to body 32.

The light received from the optical fiber or other light source is focused by window 10 in initiator 30 and the focused light passes from window 10 directly into prime 36 to heat its surface and initiate the desired chemical reaction in it. Prime 36, when initiated by the light, sets off the main load 38 which is disposed next to it in initiator 30.

It will be understood that window 10 and initiator 30 can be of any suitable size and configuration, within the limits specified above, in order to provide the desired results. Laser light transmitted by an optical fiber is the usual power source for initiator 30. The mirroring on cylinder 12 ends 14 and 22 can be of any suitable material. Moreover, window 10 can be a non-.cylindrical block, if desired, provided that end 14 is in the shape of segment of a sphere or nearly spherical object and provided that end 22 is flat or nearly flat. Window 10 need not be monolithic, but can be cemented together from 2 or more components, providing that proper reflection and focusing are not interfered with.

Various other modifications, changes, alterations and additions can be made in the improved optical explosive initiator and initiator window of the present invention, their components and parameters. All such modifications, changes, alterations and additions as are within the scope of the appended claims form part of the present invention.

What is claimed is:

1. An improved focusing optical explosive initiator window, said window comprising a block of transparent material, said block having an entrance end comprising a convex mirror in the shape of a segment of a generally spherical object, said mirror having a light receiving central opening therein along the longitudinal axis of said block, said block also having an exit end opposite said entrance end and comprising an at least generally flat mirror perpendicular to said longitudinal axis and having a light-exiting central opening therein along said longitudinal axis, whereby light passing through said entrance opening into said block is reflected by said flat mirror back to said convex mirror, then focused by said convex mirror and passes out of said block as a focused beam of increased intensity of illumination.

2. The improved window of claim 1 wherein said block is a cylinder of solid transparent material.

3. The improved window of claim 2 wherein said transparent material comprises glass, the entrance and exit ends of which are mirrored except for said central openings.

4. The improved window of claim 3 wherein said glass is silvered on said entrance and exit ends and is a unitary structure.

5. The improved window of claim 1 wherein said convex mirror has the shape of a segment of a sphere.

6. The improved window of claim 1 wherein said convex mirror has the shape of a segment of an ellipsoid.

7. The improved window of claim 1 wherein said convex mirror has the shape of a segment of one of a paraboloid and a hyperboloid.

8. The improved window of claim 1 wherein said mirror at said exit end is flat.

9. In an optical explosive initiator employing a sealed optical window to transmit light to an explosive in said initiator to initiate said explosive, the improvement which comprises utilizing a window comprising a block of transparent material, said block having an entrance end comprising a convex mirror in the shape of a segment of a generally spherical mirror, said mirror having a light-receiving central opening therethrough along the longitudinal axis of said block, said block also having an exit end opposite said entrance end and comprising an at least generally flat mirror perpendicular to said longitudinal axis and having a light-exiting central opening therethrough adjacent said explosive and along said longitudinal axis, whereby light passing into said block is reflected by said exit mirror back to said convex mirror, and is focused by said convex mirror exiting said block for improved initiation of said explosive.

10. The improved initiator of claim 9, wherein said block is a solid transparent cylinder, mirrored on said entrance and exit ends.

11. The improved initiator of claim 10 wherein said cylinder is monolithic glass silvered on said exit and entrance ends.

12. The improved initiator of claim 9 wherein said convex mirror has the shape of a segment of one of a sphere, ellipsoid, paraboloid and hyperboloid and wherein said exit mirror is flat.

* * * * *